US008169310B2

(12) United States Patent
Ono

(10) Patent No.: US 8,169,310 B2
(45) Date of Patent: May 1, 2012

(54) METHOD FOR REFLECTING CONFIGURATION VALUES OF DRIVE RECORDER

(75) Inventor: Kohhei Ono, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 362 days.

(21) Appl. No.: 12/591,211

(22) Filed: Nov. 12, 2009

(65) Prior Publication Data

US 2010/0127842 A1 May 27, 2010

(30) Foreign Application Priority Data

Nov. 25, 2008 (JP) ................................ 2008-300125

(51) Int. Cl.
*B60Q 1/00* (2006.01)

(52) U.S. Cl. ..... 340/436; 340/438; 340/439; 340/691.6; 340/5.1; 703/1; 700/97

(58) Field of Classification Search .................. 340/436, 340/425.5, 438, 439, 500, 691.1, 691.6, 3.1, 340/5.1, 6.7, 7.51, 7.52; 700/97; 703/1; 701/29

See application file for complete search history.

(56) References Cited

U.S. PATENT DOCUMENTS 7,702,437 B2 * 4/2010 Gilbert ............................ 701/29
7,705,743 B2 * 4/2010 Barone et al. ................. 340/682
7,908,123 B2 * 3/2011 Maebayashi et al. ............. 703/1

FOREIGN PATENT DOCUMENTS

JP A-2007-4378 1/2007

* cited by examiner

*Primary Examiner* — Daryl Pope
(74) *Attorney, Agent, or Firm* — Oliff & Berridge, PLC

(57) ABSTRACT

In a method in which vehicle-mounted devices on vehicles read configuration data set on a computer using a memory card, when the computer is installed remotely from the vehicles, it is inefficient to have to go back and forth between the vehicles and the place where the computer is installed every time the configuration is changed.

A method for reflecting configuration values of a drive recorder according to the present invention has the steps of: allowing a computer to read configuration values at least one of which are changed on a vehicle-mounted device side in a plurality of configuration data items in configuration data of a drive recorder; indicating side by side the configuration values on the vehicle-mounted device side and configuration values on a center side included in master data stored in the computer on a display device connected to the computer; and comparing the configuration values on the vehicle-mounted device side with the configuration values on the center side, wherein, when the configuration value on the vehicle-mounted device side set in the drive recorder and the configuration value in the master data are different from each other in any data item, at least one of the configuration value on the vehicle-mounted device side and the configuration value on the center side are indicated differently from a case in which the configuration value on the vehicle-mounted device side and the configuration value on the center side are identical to each other in any data item.

5 Claims, 12 Drawing Sheets

START

SET CONFIGURATION DATA ON COMPUTER — S101

STORE CONFIGURATION DATA IN MEMORY CARD — S102

WRITE CONFIGURATION DATA TO MEMORY OF VEHICLE-MOUNTED DEVICE — S103

END

Fig.7

| VEHICLE NUMBER | VEHICLE TYPE |
|---|---|
| 101 | A |
| 102 | B |
| 103 | A |
| . | . |
| . | . |
| . | . |

Fig.8

(a)

VEHICLE TYPE A

| | |
|---|---|
| ATTACHMENT DIRECTION | ○○ |
| PURPOSE | △△ |
| PRODUCT TYPE | □□ |
| IMPACT DETECTION | ×× |
| . | . |
| . | . |
| . | . |

(b)

VEHICLE TYPE B

| | |
|---|---|
| ATTACHMENT DIRECTION | ○○ |
| PURPOSE | △△ |
| PRODUCT TYPE | □□ |
| IMPACT DETECTION | ×× |
| . | . |
| . | . |
| . | . |

Fig.9

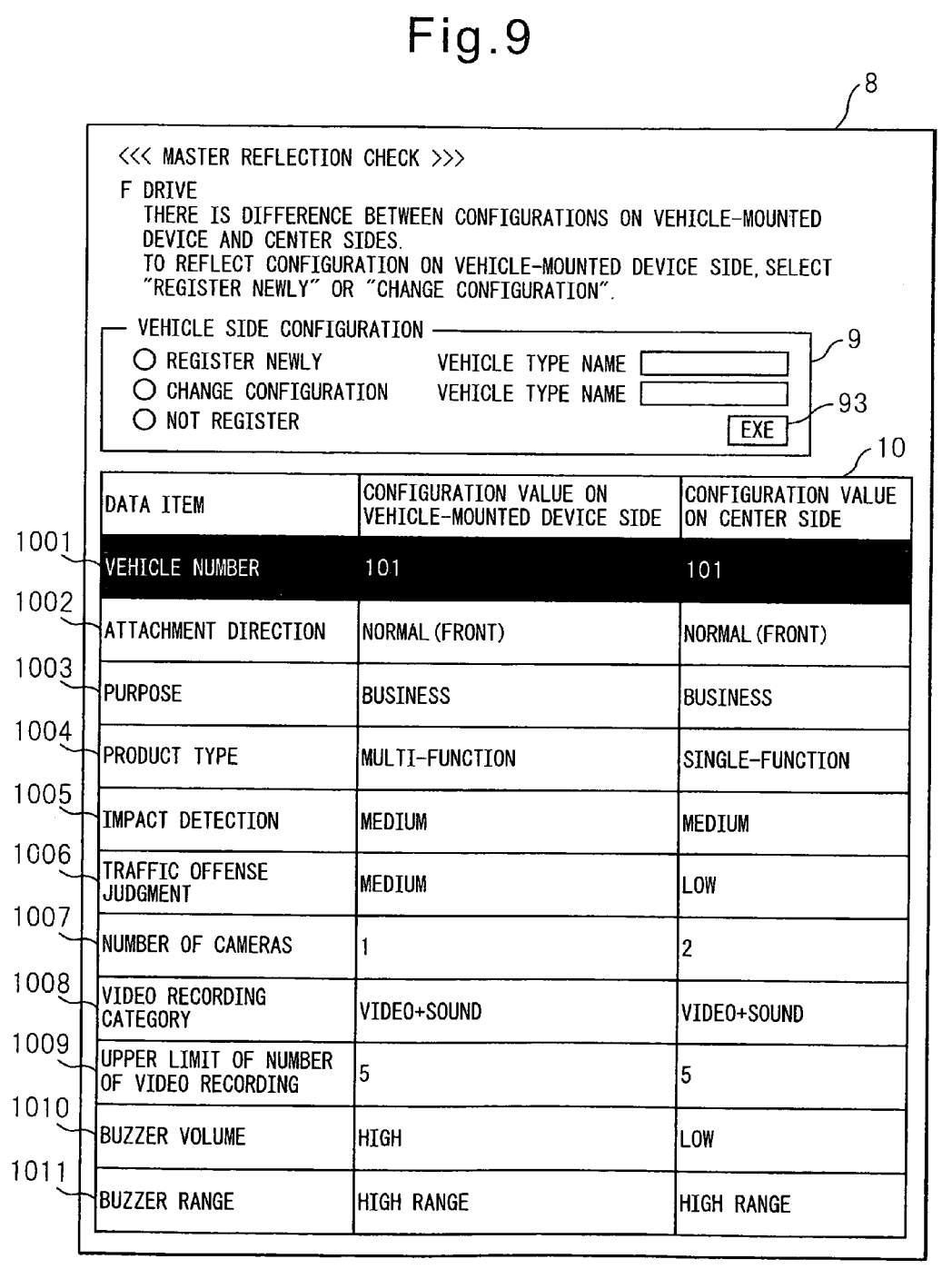

8

<<< MASTER REFLECTION CHECK >>>

F DRIVE

THERE IS DIFFERENCE BETWEEN CONFIGURATIONS ON VEHICLE-MOUNTED DEVICE AND CENTER SIDES.
TO REFLECT CONFIGURATION ON VEHICLE-MOUNTED DEVICE SIDE, SELECT "REGISTER NEWLY" OR "CHANGE CONFIGURATION".

VEHICLE SIDE CONFIGURATION (9)

- ○ REGISTER NEWLY — VEHICLE TYPE NAME [ ]
- ○ CHANGE CONFIGURATION — VEHICLE TYPE NAME [ ]
- ○ NOT REGISTER

[EXE] (93)

10

| | DATA ITEM | CONFIGURATION VALUE ON VEHICLE-MOUNTED DEVICE SIDE | CONFIGURATION VALUE ON CENTER SIDE |
|---|---|---|---|
| 1001 | VEHICLE NUMBER | 101 | 101 |
| 1002 | ATTACHMENT DIRECTION | NORMAL (FRONT) | NORMAL (FRONT) |
| 1003 | PURPOSE | BUSINESS | BUSINESS |
| 1004 | PRODUCT TYPE | MULTI-FUNCTION | SINGLE-FUNCTION |
| 1005 | IMPACT DETECTION | MEDIUM | MEDIUM |
| 1006 | TRAFFIC OFFENSE JUDGMENT | MEDIUM | LOW |
| 1007 | NUMBER OF CAMERAS | 1 | 2 |
| 1008 | VIDEO RECORDING CATEGORY | VIDEO+SOUND | VIDEO+SOUND |
| 1009 | UPPER LIMIT OF NUMBER OF VIDEO RECORDING | 5 | 5 |
| 1010 | BUZZER VOLUME | HIGH | LOW |
| 1011 | BUZZER RANGE | HIGH RANGE | HIGH RANGE |

METHOD FOR REFLECTING CONFIGURATION VALUES OF DRIVE RECORDER

This application is a new U.S. patent application that claims benefit of JP 2008-300125, filed Nov. 25, 2008, the content of JP 2008-300125 is incorporated herein by reference.

FIELD OF THE INVENTION

The present invention relates to a method for reflecting configuration values of a drive recorder, and in particular, relates to a method for reflecting configuration values changed at a drive recorder body on master data stored in an external computer.

BACKGROUND OF THE INVENTION

A drive recorder is a device for reviewing an accident that has occurred to a vehicle and come into widespread use for business and consumer purposes. The drive recorder has one or a plurality of cameras connected therewith and a built-in sensor for detecting an impact. The drive recorder detects an impact occurring to a vehicle when the vehicle collides with another vehicle by use of a sensor and stores a video image recorded at the time of the collision (For example, see Publication of Japanese Unexamined Patent Application JP-A-2007-4378). A user can set the configuration values of the drive recorder, such as the number of installed cameras and the threshold value of the impact detected by the sensor at which the recording is started.

A method for changing the configuration values of a conventional drive recorder will be described. FIG. 1 is a flow chart illustrating a procedure for setting the configuration values in a conventional drive recorder and FIG. 2 is a perspective view of the drive recorder. First, in step S101, configuration data including various configuration values of the drive recorder is set in an external computer, etc., that is not connected to the drive recorder body. Next, in step S102, the set configuration data is stored in a memory card, etc. Next, in step S103, memory card 2 that stores the configuration data set on the computer is inserted into a memory card slot 3 of drive recorder 1 (hereinafter referred to as the "vehicle-mounted device") mounted on a vehicle as illustrated in FIG. 2 to write the configuration data to a memory 4 such as FROM® in the vehicle-mounted device. By performing this procedure, for example, when there is a plurality of vehicles, the configuration data can be managed in an integrated fashion on the computer.

For example, when there are a plurality of vehicles, the procedure for writing identical configuration data A to vehicle-mounted devices 101, 102 and 103 that are drive recorders mounted on the respective vehicles will be described using FIG. 3. First, in step S301, configuration data A commonly used in vehicle-mounted devices 101 to 103 is set in a computer provided outside the vehicle-mounted devices. Next, in step S302, configuration data A is stored in a memory card. Next, in step S303, the memory card is inserted into vehicle-mounted device 101 and configuration data A is written to a memory. Similarly, in step S304, configuration data A is written to a memory of vehicle-mounted device 102, and in step S305, configuration data A is written to a memory of vehicle-mounted device 103. In this way, configuration data A that is commonly used in vehicle-mounted devices 101 to 103 mounted on the plurality of vehicles can be modified or changed on the computer at once, so as to simplify the operation for setting the configuration data commonly used in the plurality of vehicle-mounted devices.

On the other hand, in addition to the above-described method in which the configuration data changed on the computer provided outside the vehicle-mounted device is written to the vehicle-mounted device, there is also known another method in which the configuration data is changed on the vehicle-mounted device side. FIG. 4 is a perspective view of a vehicle-mounted device equipped with a terminal. Vehicle-mounted device 1 is connected to a terminal 5. Terminal 5 comprises a display section 7 and a keypad 6, such as a 10-key numeric pad for inputting data. Further, vehicle-mounted device 1 has a built-in memory 4 such as FROM® that can store the configuration data of the vehicle-mounted device. The configuration data of vehicle-mounted device 1 is changed by displaying the configuration data stored in memory 4 to the display section 7 and manipulating keypad 6. In this way, the user can change the configuration data of the vehicle-mounted devices individually.

However, in the above method in which each of the vehicle-mounted devices on the vehicles read the configuration data set on the computer using the memory card, there are following problems.

First, when the computer is installed remotely from the vehicles, it is inefficient to have to go back and forth between the vehicles and the place where the computer is installed every time the configuration is changed.

Further, because the configuration data can be changed on each vehicle not via the computer, the difference between the configuration values set in the master table on the computer and the configuration values set in the vehicle-mounted device cannot be recognized.

On the other hand, in the method in which the configuration data is changed using the terminal connected to the vehicle-mounted device, the configuration data is not managed by any external device such as the computer, and therefore it is inefficient to have to change the configuration data similarly in the individual vehicle-mounted devices mounted on vehicles having the same vehicle type and using identical configuration data.

Therefore, it is an object of the present invention to provide a method for efficiently changing configuration data of a vehicle-mounted device mounted on a vehicle.

SUMMARY OF THE INVENTION

A method for reflecting configuration values of a drive recorder according to the present invention comprises the steps of: allowing a computer to read configuration values at least one of which are changed on a vehicle-mounted device side in a plurality of configuration data items in configuration data of a drive recorder; indicating side by side the configuration values on the vehicle-mounted device side and configuration values on a center side included in master data stored in the computer on a display device connected to the computer; and comparing the configuration values on the vehicle-mounted device side with the configuration values on the center side, wherein, when the configuration value on the vehicle-mounted device side set in the drive recorder and the configuration value on the center side in the master data are different from each other in any data item, at least one of the configuration value on the vehicle-mounted device side and the configuration value on the center side are indicated differently from a case in which the configuration value on the vehicle-mounted device side and the configuration value on the center side are identical to each other in any data item.

According to the present invention, the configuration data of the drive recorder can be changed efficiently. Further, when the master data is different from the data of the vehicle-mounted device, the difference can be recognized.

DESCRIPTION OF THE DRAWINGS

These and other features and advantages of the present invention will be better understood by reading the following detailed description, taken together with the drawings wherein:

FIG. 7 is an example of vehicle master data;

FIGS. 8(*a*) and 8(*b*) are examples of vehicle type master data;

FIG. 9 is a schematic diagram of a master reflection check screen in which font color of changed configuration values is changed;

DETAILED DESCRIPTION OF THE PREFERRED EMBODIMENTS

A method for reflecting configuration values of a drive recorder according to the present invention will be described below with reference to the drawings. It should, however, be noted that the technical scope of the present invention is not limited to the specific embodiments described herein, but extends to the inventions described in the appended claims and their equivalents.

Embodiment 1

Figures 1, 2:
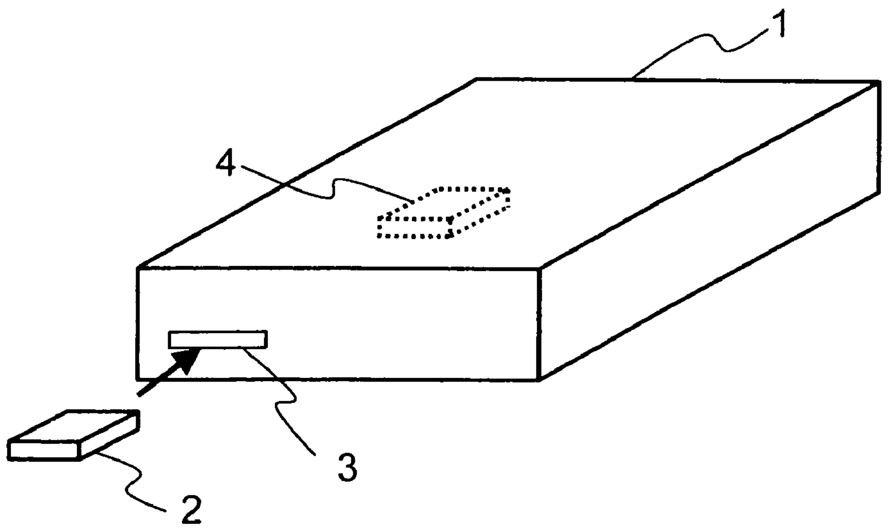
FIG. 1 is a flow chart illustrating a procedure to set data in a conventional vehicle-mounted device.
FIG. 2 is a perspective view of a conventional vehicle-mounted device.
Figure 3:
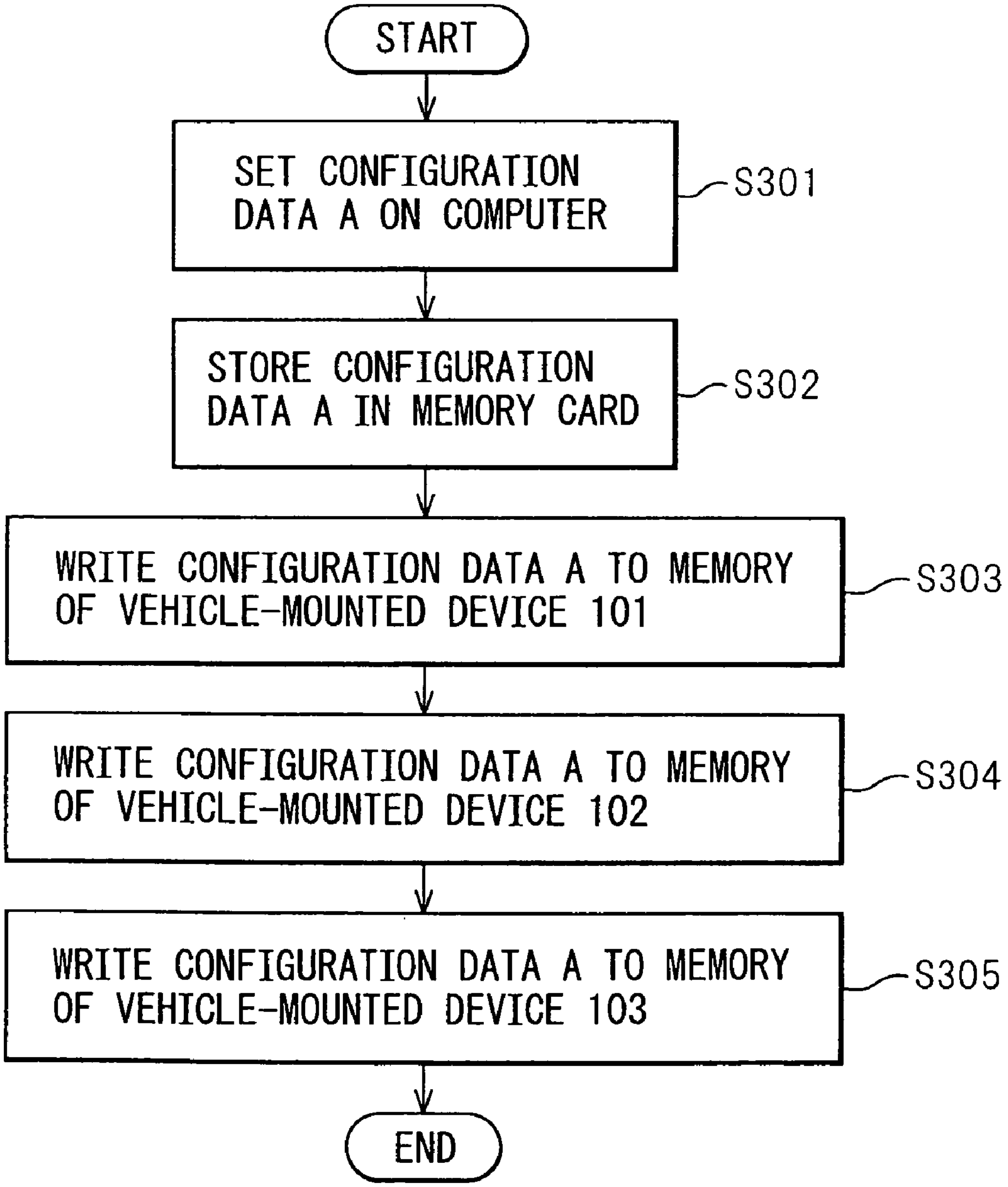
FIG. 3 is a flow chart illustrating a procedure to set data in a plurality of conventional vehicle-mounted devices.
Figure 4:
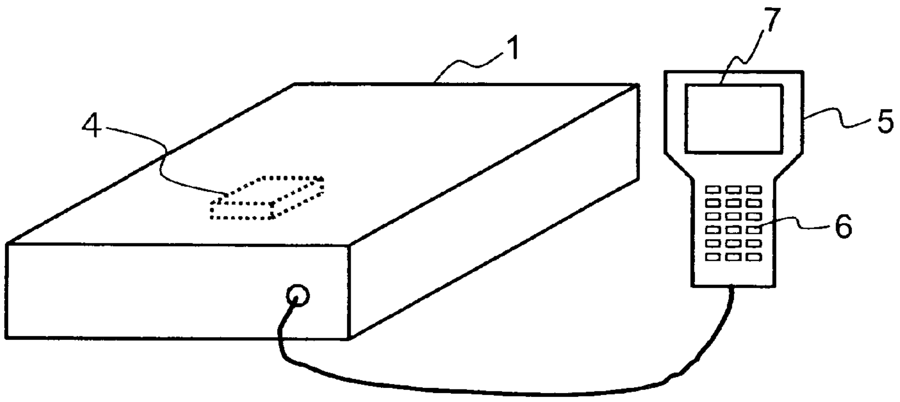
FIG. 4 is a perspective view of a conventional vehicle-mounted device equipped with a terminal.
Figure 5:
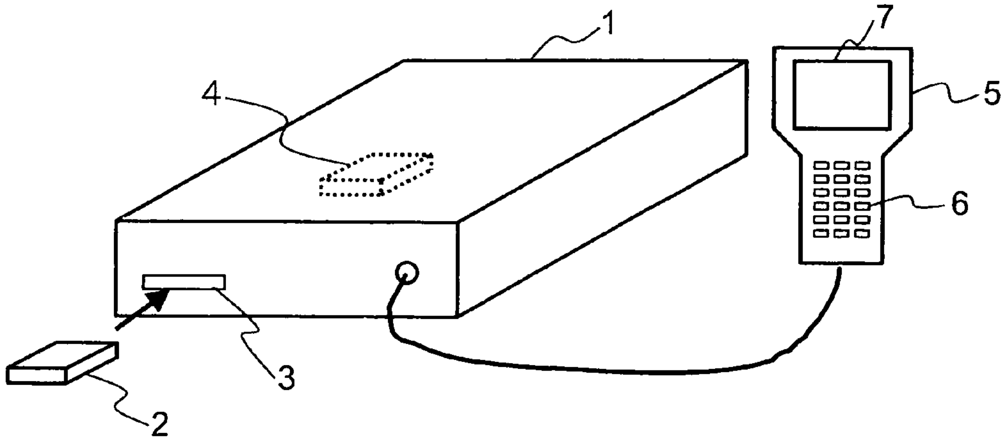
FIG. 5 is a perspective view of a vehicle-mounted device used in embodying the present invention.

A first embodiment of the present invention will be described with reference to the drawings. FIG. 5 illustrates a perspective view of a vehicle-mounted device that is used to implement a method for reflecting configuration values of a drive recorder according to the first embodiment of the present invention. The vehicle-mounted device 1 comprises a memory 4 such as an FROM® provided in a main body of the vehicle-mounted device, a memory slot 3 into which a memory card 2 such as an SD card is inserted, and a terminal 5. Terminal 5 can change various configuration data of vehicle-mounted device 1. The configuration data can be changed by reading the data stored in memory 4 and displaying it on a display section 7, selecting the data items desired to be changed using a keypad 6 such as a 10-key numeric pad, and inputting desired values. Further, the changed configuration data can be stored not only in memory 4 but also in memory card 2 inserted into memory slot 3. In order to allow an external computer and the like to read the changed configuration data, the memory card can be connected to the external computer.

Further, the configuration values recorded in the memory card can be read by a different vehicle-mounted device to be set therein. That is, the configuration data of the vehicle-mounted device of the different vehicle can be changed directly not via a central computer.

Figure 6:
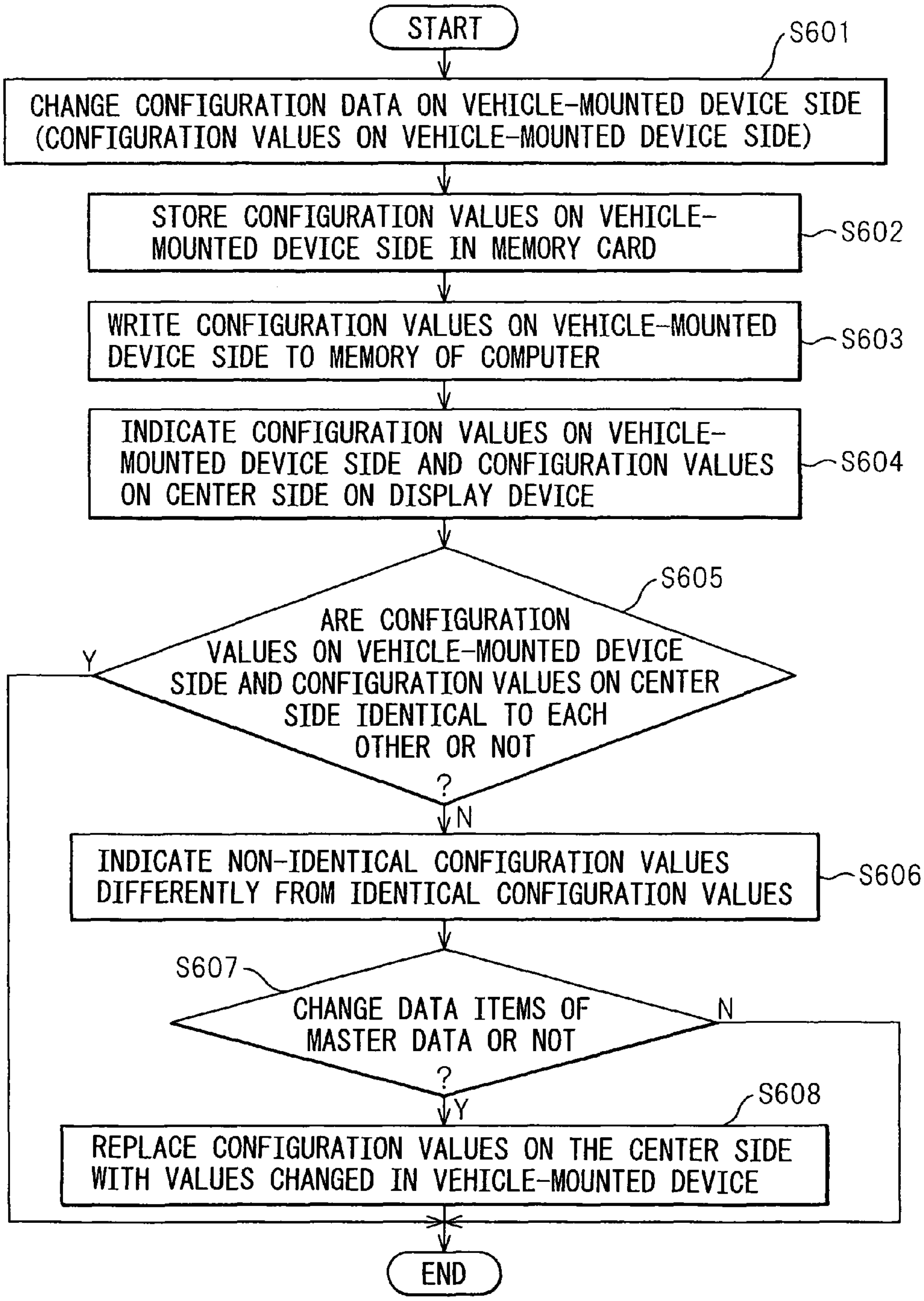
FIG. 6 is a flow chart illustrating a procedure to set data in a vehicle-mounted device of the present invention.

FIG. 6 is a flow chart illustrating the method for reflecting the configuration values of the drive recorder according to the first embodiment of the present invention. The method for reflecting the configuration values of the drive recorder according to the first embodiment includes: changing the configuration data at the vehicle-mounted device; allowing the external computer to read the changed configuration data (the configuration values on the vehicle-mounted device side) via memory card and the like; and comparing the read data with master data (the configuration values on the center side) previously stored in the computer, wherein data items in which the configuration values changed in the vehicle-mounted device are different from the configuration values on the center side are indicated differently from the other unchanged data items. Then, paying attention to the differently indicated data items, it is determined whether to reflect some or all of the configuration data values changed in the vehicle-mounted device on the master data or not.

In the method for reflecting the configuration values of the drive recorder according to the first embodiment, first, in step S601 in FIG. 6, the configuration data is changed on the vehicle-mounted device side. More specifically, in vehicle-mounted device 1 illustrated in FIG. 5, the configuration data desired to be changed is read out on display section 7 of terminal 5 and the desired data items are changed. Here, the configuration values after the change is referred to as the "configuration values on the vehicle-mounted device side". Next, in step S602, the configuration data including the configuration values on the vehicle-mounted device side changed by using terminal 5 is stored in memory card 2 inserted into memory slot 3 of vehicle-mounted device 1. At this time, the configuration values on the vehicle-mounted device side may be stored not only in memory card 2 but also in memory 4 inside the main body of the vehicle-mounted device.

Next, in step S603, memory card 2 is removed from memory card slot 3 of vehicle-mounted device 1 and connected to the computer provided outside vehicle-mounted device 1 to write the configuration values on the vehicle-mounted device side to a memory of the computer. After that, in step S604, dedicated application software for managing the configuration data is executed to display the configuration data including the configuration values on the vehicle-mounted device side on a display section of the computer. At this time, if the configuration data of vehicle-mounted device 1 before the change is stored in the computer, this configuration data is read out and displayed on the display device so that the configuration values in each data item both of the vehicle-mounted device and computer are indicated as illustrated in FIG. 9. The configuration values included in the configuration data before the change in vehicle-mounted device 1 is referred to as “the configuration values on the center side”.

The configuration values on the center side are read out as follows. The vehicle master data illustrated in FIG. 7 and the vehicle type master data illustrated in FIGS. 8(*a*) and 8(*b*) are previously stored in the computer on the center side.

The vehicle master data is a table for indicating vehicle numbers and corresponding vehicle types and the vehicle type master data stores the configuration data or the configuration values on the center side of each vehicle type. FIG. 8(*a*) illustrates an example of the configuration data of vehicle type A and FIG. 8(*b*) illustrates an example of the configuration data of vehicle type B.

Because the vehicle numbers are previously stored in the configuration values on the vehicle-mounted device side, the vehicle numbers are extracted from the configuration values on the vehicle-mounted device side read out of memory card 2 and, based on the vehicle numbers, the vehicle types are identified from the vehicle master data. As a result, the configuration values on the center side is extracted from the master data and indicated on the display device with the configuration values on the vehicle-mounted device side.

Next, in step S605, the application software mentioned above decides whether the configuration values on the vehicle-mounted device side changed in the vehicle-mounted device 1 and the configuration values on the center side previously stored in the computer are identical to each other in each data item or not. If there are one or more data items in which the values are not identical, in step S606, such data items are indicated differently from the data items in which the values are identical. Specific indication manners will be described below. As described above, among a plurality of configuration data items included in the configuration data, the data items in which the configuration values are changed are indicated differently from those in which the configuration values are not changed and, therefore, a user can accurately decide whether to reflect the changed data items on the master data and, as a result, working efficiency can be improved. On the other hand, when all configuration values in the configuration data items of the configuration data on the vehicle-mounted device side are identical to those of the master data on the center side, it can be determined that the configuration data is not changed and none of the configuration values in the data items is indicated differently. As a result, the process terminates without reflecting the configuration data on the vehicle-mounted device side on the master data.

Next, in step S607, it is determined whether to replace the values of the data items of the master data with the values changed in vehicle-mounted device 1 or not according to the user’s instructions through operation keys of the computer. This embodiment illustrates an example in which the user instructs whether to collectively replace a plurality of changed data items or not. However, when there are a plurality of changed data items, the user may alternatively decide individually for each changed data item whether to reflect the change on the master data or not. When the user instructs the computer to make the change, in step S608, the configuration values on the center side before the change that are indicated on the display device is replaced with the values changed in the vehicle-mounted device. As described above, when deciding whether to reflect the configuration data changed in the vehicle-mounted device on the master data or not, with respect to the data items whose configuration values is changed, the difference between the configuration data changed in the vehicle-mounted device and the master data can be made clear.

Next, indication manners are specifically described for indicating side by side the configuration values on the vehicle-mounted device side included in the configuration data changed in the vehicle-mounted device and the configuration values on the center side included in the master data on the screen of the computer. FIG. 9 is a schematic diagram of a master reflection check screen in which font color of the changed configuration values is changed. Master reflection check screen 8 mainly includes a vehicle side configuration registration check part 9 and a configuration data display part 10. In vehicle side configuration registration check part 9, it is selected whether to register the configuration data changed in the vehicle-mounted device as new master data, to change the configuration or not to register the changed configuration data. In order to select to newly register the changed data or change the configuration of the existing master data, a vehicle type name has to be also entered.

On the other hand, configuration data display part 10 indicates the configuration values on the vehicle-mounted device side in the configuration data changed on the vehicle-mounted device side in comparison with the configuration values in the master data on the center side in a plurality of data items. For example, as indicated in a data item column, data items indicated for the comparison includes vehicle number 1001, attachment direction 1002, purpose 1003, product type 1004, impact detection 1005, traffic offense judgment 1006, number of cameras 1007, video recording category 1008, upper limit of number of video recording 1009, buzzer volume 1010, buzzer range 1011 and so on. Vehicle number field 1001 indicates individual vehicle numbers. In this case, one vehicle is typically provided with one drive recorder and, therefore, the vehicle number has to be identical on both the vehicle-mounted device and center sides. In this embodiment, the vehicle number “101” is identical on the both sides. In this embodiment, in the fields of attachment direction 1002, purpose 1003, impact detection 1005, number of cameras 1007, video recording category 1008, upper limit of number of video recording 1009, and buzzer range 1011, the respective configuration values are identical on the vehicle-mounted device and center sides and they are indicated in an identical manner.

On the other hand, in the fields of product-type 1004, traffic offense judgment 1006 and buzzer volume 1010, the configuration values on the vehicle-mounted device side are different from those on the center side.

In this embodiment, the font colors of the configuration values on the vehicle-mounted device side are different from that on the center side to make clear the difference between the both sides. For example, in the field of product type 1004, the configuration value “multi-function” changed on the vehicle-mounted device side is indicated in red font and the configuration value “single-function” on the center side is indicated in black font, so that the difference between them can be shown clearly. Further, in order to show the difference between them more clearly, while the configuration value “multi-function” changed on the vehicle-mounted device side is indicated in red font similarly to the above example, the configuration value “single-function” on the center side may be indicated in not black but blue font. Alternatively, the both values on the vehicle-mounted device and center sides may be indicated in the same (red) font. Still further, not only the configuration values but also the name of the configuration data item “product type” may be indicated in a different color from that of the other data items. For example, the names of the configuration data items "attachment direction" and "purpose" in each of which the configuration value is identical on both the vehicle-mounted device and center sides may be indicated in black font while the name "product type" may be indicated in red font. Thus, by changing the font color of the names of the configuration data items, the changed data items can be grasped more clearly.

As described above, when the configuration data set on the vehicle-mounted device side is read into the computer and displayed in comparison with the master data by using the dedicated application software, among the plurality of configuration values included in the configuration data, only the configuration values in the data items that are different between the vehicle-mounted device and center sides are indicated in a color different from the configuration values in the data items that are identical on both sides, so that the data items in which the configuration is changed can be shown clearly.

Embodiment 2

Figure 10:
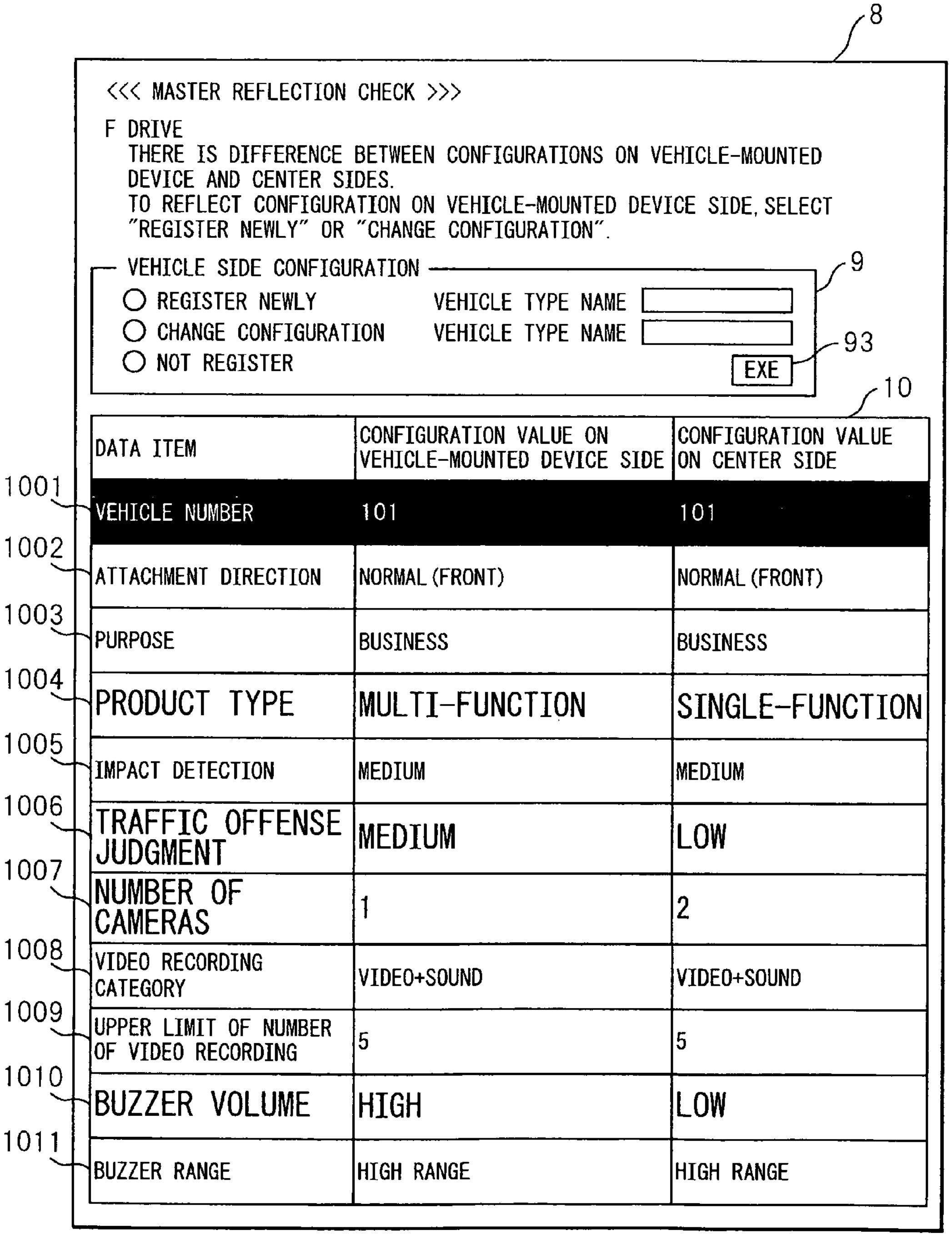
FIG. 10 is a schematic diagram of a master reflection check screen in which font size of changed configuration values is changed.

Next, a second embodiment of the present invention will be described with reference to FIG. 10. In the second embodiment, in order to indicate changed configuration values, font size of the changed configuration values is changed. FIG. 10 illustrates a master reflection check screen in which the font size of the changed configuration values is changed. In this embodiment, the configuration values in the data items that are different between the vehicle-mounted device and center sides are indicated in larger font than the configuration values in the data items that are identical on both sides.

More specifically, the configuration values in the data items "product type 1004", "traffic offense judgment 1006", "number of cameras 1007" and "buzzer volume 1010" in which the configuration values are different between the vehicle-mounted device and center sides are indicated in larger font than the configuration values in the data items "attachment direction 1002" and so on in which the configuration values are identical on the both sides. By indicating the configuration values that are different between the vehicle-mounted device and center sides in larger font as described above, the changed data items can be recognized accurately, and therefore it can be accurately determined whether to reflect the configuration values changed on the vehicle-mounted device side on the master data or not and working efficiency can be improved. Further, in this embodiment, not only the configuration values but also the configuration data items including the changed configuration data values may be indicated in larger font.

Embodiment 3

Figure 11:
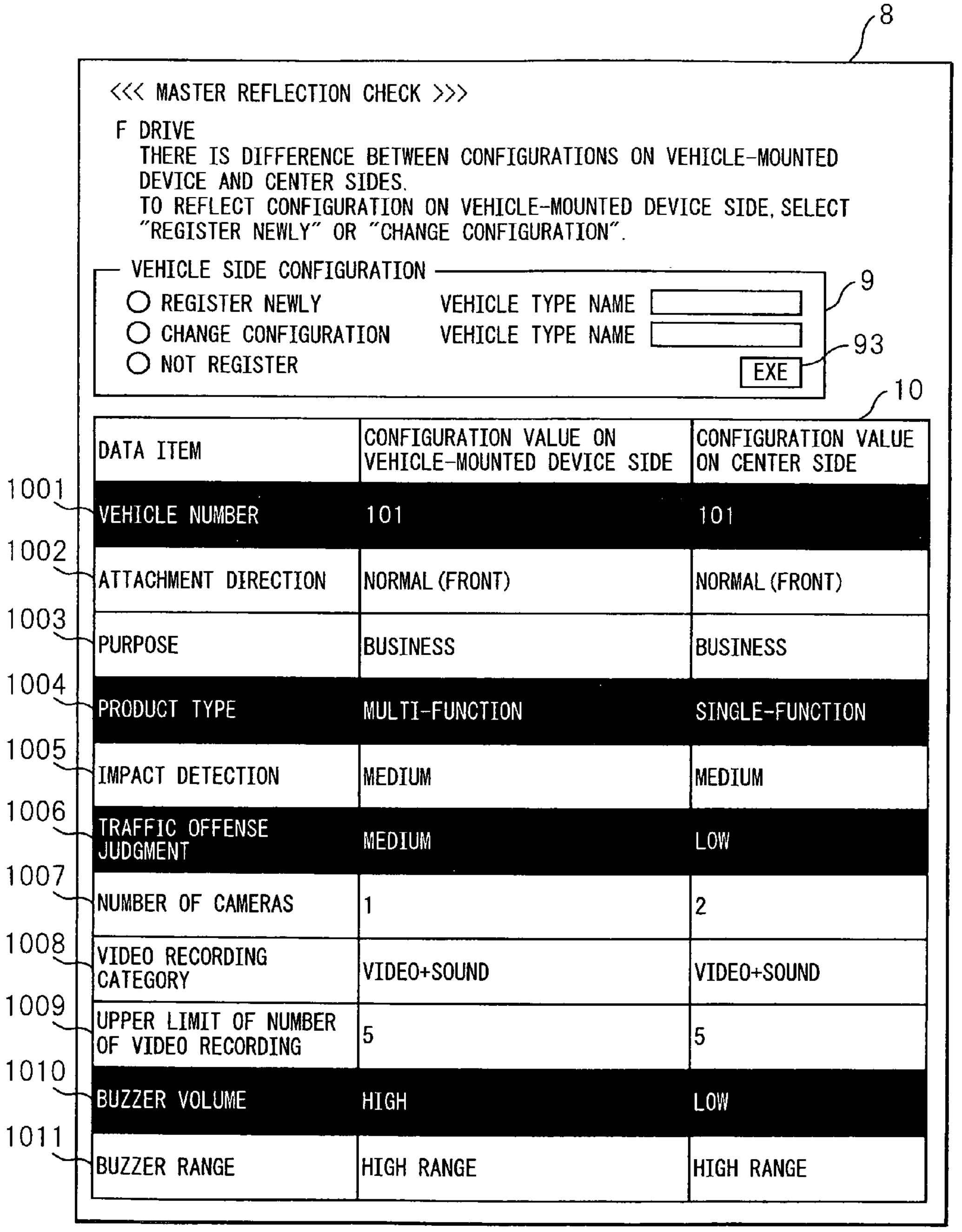
FIG. 11 is a schematic diagram of a master reflection check screen in which the background color of changed configuration values is changed.

Next, a third embodiment of the present invention will be described with reference to FIG. 11. In the third embodiment, in order to indicate changed configuration values, color of the area behind font of the changed configuration values or, in other words, background color of font is changed. FIG. 11 illustrates a master reflection check screen in which color of the area behind font of changed configuration values is changed. In this embodiment, color combination of the font and the area behind the font of the configuration values in the data items that are different between the vehicle-mounted device and center sides are indicated to be in a reversed relationship to that of the configuration values in the data items that are identical on the both sides.

More specifically, the font and the area behind the font of the configuration values in the data items "product type 1004", "traffic offense judgment 1006", "number of cameras 1007" and "buzzer volume 1010" in which the configuration values are different between the vehicle-mounted device and center sides are indicated to be in a reversed relationship to that in the data items "attachment direction 1002" and so on in which the configuration values are identical on the both sides. For example, when the font is black and the background is white in the data items in which the configuration values are identical on the vehicle-mounted device and center sides, the font is white and the background is black in the data items in which the configuration values are different between the vehicle-mounted device and center sides. By highlighting the configuration values that are different between the vehicle-mounted device and center sides as described above, the changed data items can be recognized accurately, and therefore it can be accurately determined whether to reflect the configuration values changed on the vehicle-mounted device side on the master data or not and working efficiency can be improved. Further, in this embodiment, not only the configuration values but also the configuration data items including the changed configuration data values may be highlighted.

Further, the indication manner of the font color is not limited to the above examples. For example, when the configuration values that are identical on the vehicle-mounted device and center sides have white font and black background, the configuration values that are different between the vehicle-mounted device and center sides may have reversed contrast and arbitral font and background colors, such as blue font and yellow background.

Alternatively, when the configuration values that are identical on the vehicle-mounted device and center sides have white font and black background, the configuration values that are different between the vehicle-mounted device and center sides may still have white font, but the background color may be changed to red.

As described above, by indicating the background behind the font in different color depending on the difference of the configuration values between the vehicle-mounted device and center sides, if there are any configuration values that are different between the vehicle-mounted device and center sides, the values can be read accurately in a moment and, therefore, it can be efficiently decided whether to reflect the configuration values changed on the vehicle-mounted device side on the master data or not.

In the above description, though there have been illustrated examples in which, when the configuration values are different between the vehicle-mounted device and center sides, the font color, font size and/or background color are changed, they may be changed in any combination. For example, both the font color and size may be changed or both the font size and background color may be changed.

Further, in the above embodiments, though there have been illustrated examples in which, when the configuration values are different between the vehicle-mounted device and center sides in a plurality of data items, the indication manner of the changed configuration values in the plurality of data items is changed uniformly, the indication manner may be different in different data items. For example, only the font color may be changed in the data item "product type 1004" and the font size and background color may be changed in the data item "traffic offense judgment 1006". By changing the indication manner differently in different data items as described above, important data items can be indicated emphatically. As a result, when deciding whether to reflect the configuration values on the vehicle-mounted device side on those on the center side or not, overlooking the important data items can be avoided and the operation can be performed more accurately.

Next, when there are a plurality of vehicles equipped with respective drive recorders, a procedure to manage configuration data of the plurality of drive recorders mounted on each vehicle will be described using the drawings. For example, it is assumed that there are three vehicles that have respective vehicle numbers 101, 102 and 103. Further, as illustrated in FIG. 7, it is assumed that vehicles 101 and 103 belong to vehicle type A and vehicle 102 belongs to vehicle type B. In this case, vehicles 101 and 103 belong to the same vehicle type. As illustrated in FIGS. 8(*a*) and 8(*b*), the configuration data is set for each vehicle type and, therefore, when the configuration data of vehicle 101 is changed, the configuration data of vehicle 103 belonging to the same vehicle type is also changed.

Figure 12:
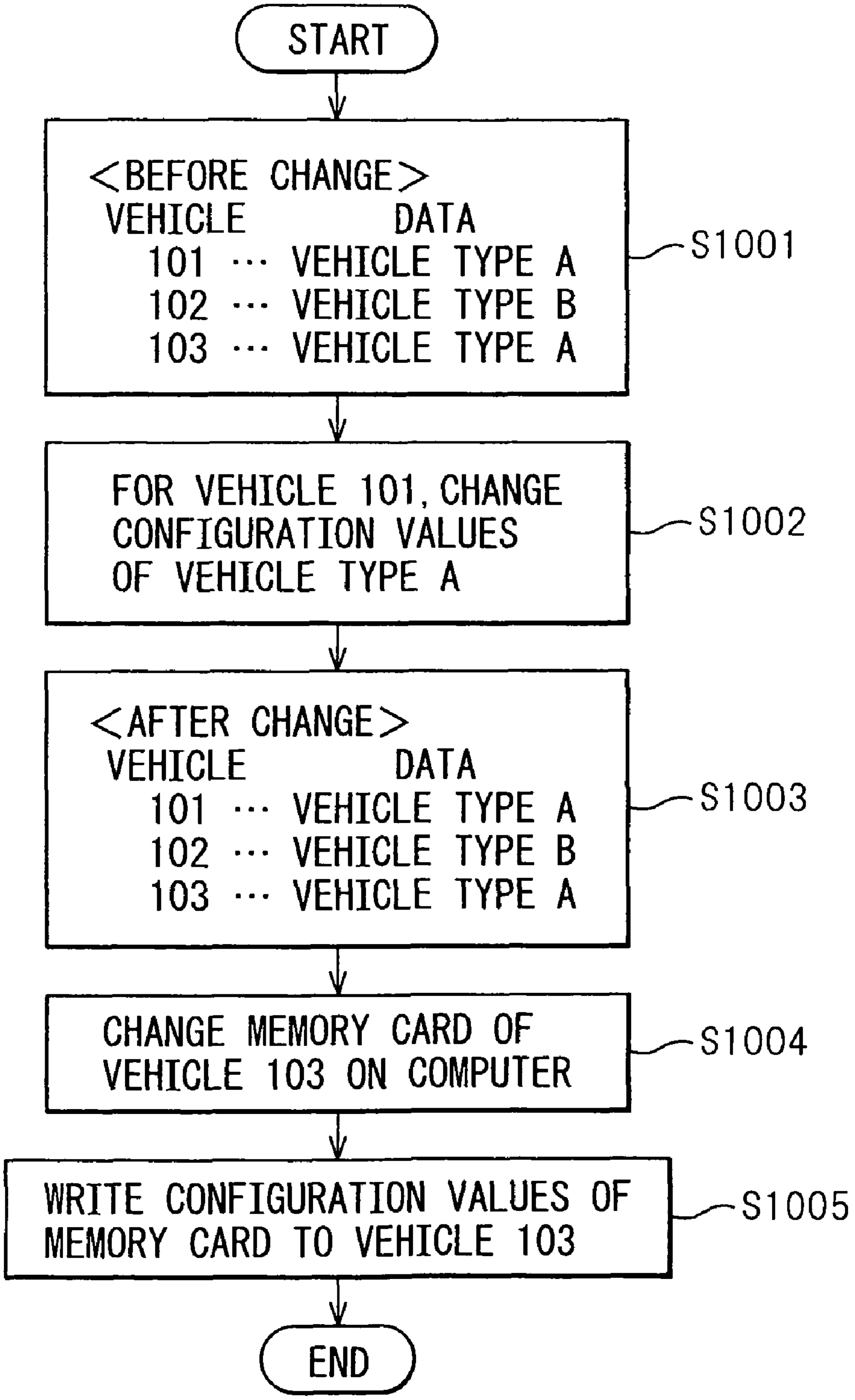
FIG. 12 is a flow chart illustrating a procedure of similarly changing configuration data in vehicle-mounted devices of vehicles having the same vehicle type.

To begin with, a procedure to allow vehicle 103 to belong to the same vehicle type as that of vehicle 101 will be described using FIG. 12. FIG. 12 is a flow chart illustrating a procedure in which configuration data of a vehicle-mounted device on one vehicle is changed similarly to that on the other vehicle belonging to the same vehicle type. First, in step S1001, as illustrated in FIG. 7, configuration data of vehicle-mounted devices on vehicles 101, 102 and 103 before changing the configuration data is allowed to belong to vehicle type A, B and A, respectively. Next, in step S1002, the configuration data of the vehicle-mounted device on vehicle 101 or, in other words, vehicle type master data illustrated in FIG. 8(*a*) is changed. Because the configuration data of the vehicle-mounted device on vehicle 101 belongs to vehicle type A before the change, it still belongs to vehicle type A after the change if it is registered as of the same vehicle type. When the configuration is changed, the vehicle type remains to be A and, assuming that the data of A before the change is $a_1$, $a_1$ is replaced by another data $a_2$.

Figure 13:
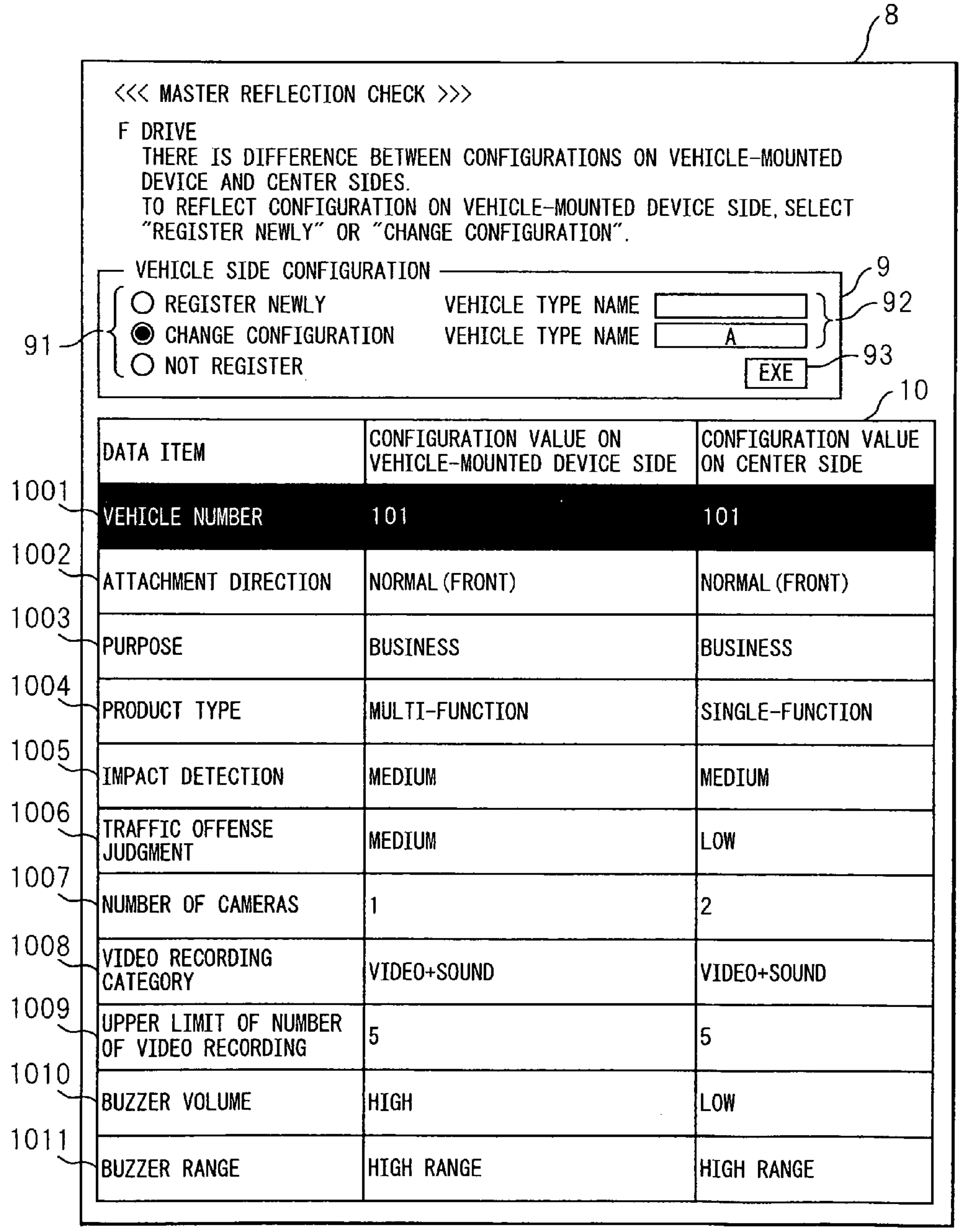
FIG. 13 is a schematic diagram of a master reflection check screen when changed configuration data is reflected as that of an identical vehicle type.

A specific configuration procedure will be described using FIG. 13. FIG. 13 is a schematic diagram of a master reflection check screen when specifying any vehicle type and changing configuration of the specified vehicle type. After checking the difference between configuration values on the vehicle-mounted device and center sides, when the changed configuration data is reflected on the master data, one of three options "register newly", "change configuration" or "not register" can be selected in vehicle side configuration registration check part 9 in FIG. 13. In this case, because it is assumed that the changed configuration data is reflected on the master data as that of the same vehicle type, select "change configuration" option in an option selection part 91 inside a box in vehicle side configuration registration check part 9, enter "A" in a vehicle type specification part 92 at the right side of option selection part 91 and, then, click an "enable reflection" button 93. As a result, the configuration values on the vehicle-mounted device side of vehicle type A are reflected on those on the center side.

As a result of the above procedure, as illustrated in step S1003, after the change, vehicles 101 and 103 belong to "vehicle type A" and vehicle 102 belongs to "vehicle type B". Next, in step S1004, the memory card of the vehicle-mounted device of vehicle 103 is inserted into the computer to reflect the changed configuration data of vehicle type A on the configuration data of vehicle type A stored in the memory card. Then, in step S1005, the memory card is inserted into the vehicle-mounted device on vehicle 103 to write the changed configuration data to the memory of the vehicle-mounted device.

By performing the above procedure, the configuration data changed in the vehicle-mounted device of vehicle 101 belonging to vehicle type A can be reflected on the configuration data of vehicle 103 that is not changed directly. In this way, the configuration data of the vehicle-mounted devices on a plurality of vehicles belonging to an identical vehicle type can be changed efficiently and the configuration data of the vehicle-mounted devices on the plurality of vehicles can be managed collectively and accurately.

Figure 14:
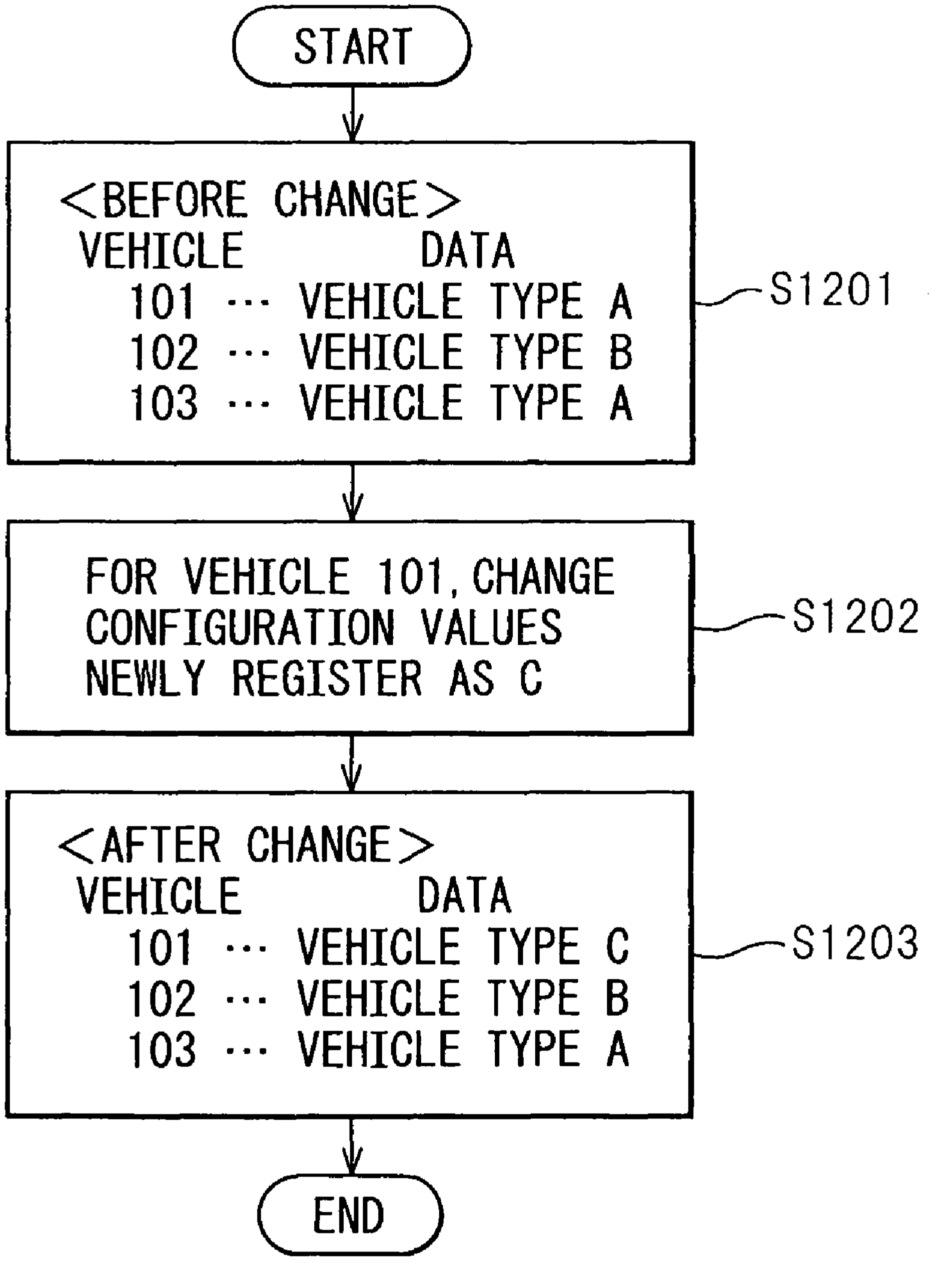
FIG. 14 is a flow chart illustrating a procedure for setting the configuration data in vehicles having the same vehicle type.

Next, a procedure to allow vehicle 103 to belong to a different vehicle type from that of vehicle 101 will be described using FIG. 14. FIG. 14 is a flow chart illustrating a procedure in which configuration data of vehicle-mounted devices on some vehicles among those belonging to an identical vehicle type is allowed to belong to a different vehicle type. First, in step S1201, configuration data of vehicle-mounted devices on vehicles 101, 102 and 103 before changing the configuration data is allowed to belong to vehicle type A, B and A, respectively. Next, in step S1202, the configuration data of the vehicle-mounted device on vehicle 101 is changed. The configuration data of the vehicle-mounted device on vehicle 101 that belongs to vehicle type A before the change is allowed to belong to vehicle type C.

Figure 15:
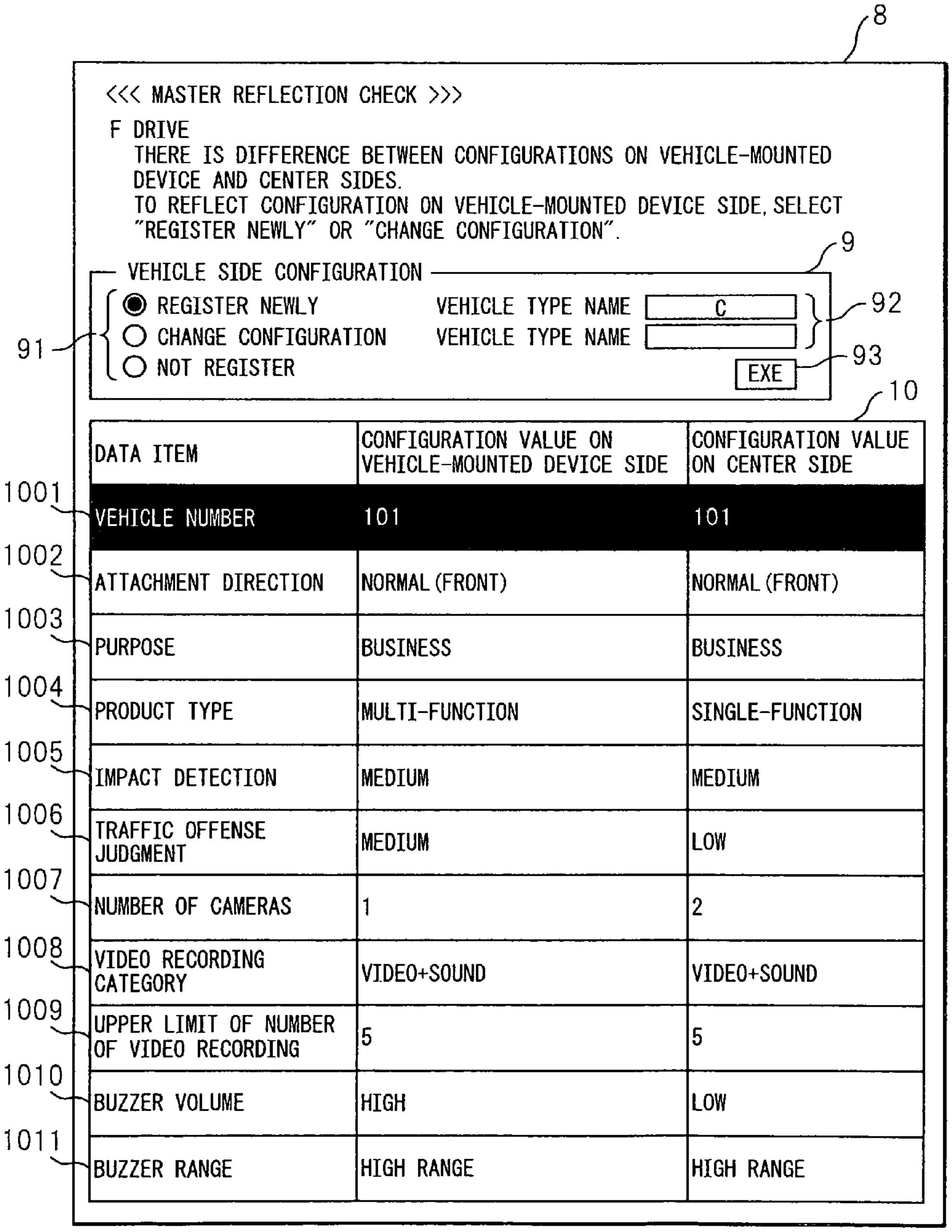
FIG. 15 is a schematic diagram of a master reflection check screen when changed configuration data is reflected as that of a different vehicle type.

A specific configuration procedure will be described using FIG. 15. FIG. 15 is a schematic diagram of a master reflection check screen when specifying any vehicle type and changing configuration of the specified vehicle type. After checking the difference between configuration values on the vehicle-mounted device and center sides, when the changed configuration data is reflected on the master data, one of three options "register newly", "change configuration" or "not register" can be selected in vehicle side configuration registration check part 9 in FIG. 15. In this case, because it is assumed that the changed configuration data is reflected on the master data as that of a different vehicle type, select "register newly" option in option selection part 91 inside a box in vehicle side configuration registration check part 9, enter "C" in vehicle type specification part 92 at the right side of option selection part 91, and then, click "enable reflection" button 93.

As a result of the above procedure, as illustrated in step S1203, after the change, vehicle 101 belongs to "vehicle type C", vehicle 102 belongs to "vehicle type B" and vehicle 103 belongs to "vehicle type A".

By performing the above procedure, though the configuration data of the vehicle-mounted device on vehicle 101 belongs to vehicle type A before changing the configuration data, it can be changed independently without affecting the other vehicles (for example, vehicle 103) belonging to vehicle type A. In this way, the configuration data of the vehicle-mounted devices on some of a plurality of vehicles belonging to an identical vehicle type can be changed efficiently and the configuration data of the vehicle-mounted devices on the plurality of vehicles can be managed collectively and accurately.

As described above, according to the present invention, the configuration data changed on the vehicle-mounted device side can be efficiently reflected on the master data. Though examples in which the data is transferred from the vehicle-mounted device to the computer via the memory card are illustrated in the above embodiments, if communication means are provided in the vehicle-mounted device and computer, the configuration data may be transferred between the vehicle-mounted device and the computer directly or indirectly via a network.

What is claimed is:

1. A method for reflecting configuration values of a drive recorder comprising:

allowing a computer to read configuration values at least one of which are changed on a vehicle-mounted device side in a plurality of configuration data items in configuration data of a drive recorder;

indicating side by side said configuration values on the vehicle-mounted device side and configuration values on a center side included in master data stored in said computer on a display device connected to said computer; and comparing said configuration values on the vehicle-mounted device side with the configuration values on the center side, wherein, when the configuration value on the vehicle-mounted device side set in said drive recorder and the configuration value in the master data are different from each other in any data item, at least one of the configuration value on the vehicle-mounted device side and the configuration value on the center side are indicated differently from a case in which the configuration value on the vehicle-mounted device side and the configuration value on the center side are identical to each other in any data item.

2. A method for reflecting configuration values of a drive recorder according to claim 1, wherein the method further has the step of determining whether to reflect the configuration data changed in said drive recorder on said master data or not.

3. A method for reflecting configuration values of a drive recorder according to claim 1, wherein, when the configuration data changed in said vehicle-mounted device is not reflected on said master data, said configuration data is read upon startup of said vehicle-mounted device.

4. A method for reflecting configuration values of a drive recorder according to claim 1, wherein, when said vehicle-mounted device's vehicle type is not yet set, it is set to be a default group.

5. A method for reflecting configuration values of a drive recorder according to claim 1, wherein, when said configuration data is registered, not only a vehicle number but also a vehicle type are specified.

* * * * *